(12) United States Patent
Yamaguchi

(10) Patent No.: US 11,148,242 B2
(45) Date of Patent: Oct. 19, 2021

(54) CLAMPING DEVICE

(71) Applicant: NIIGATA KIKAI CO., LTD., Sanjo (JP)

(72) Inventor: Noboru Yamaguchi, Sanjo (JP)

(73) Assignee: W&N CO., LTD., Sanjo (JP)

( * ) Notice: Subject to any disclaimer, the term of this patent is extended or adjusted under 35 U.S.C. 154(b) by 165 days.

(21) Appl. No.: 16/528,790

(22) Filed: Aug. 1, 2019

(65) Prior Publication Data

US 2020/0039013 A1 Feb. 6, 2020

(30) Foreign Application Priority Data

Aug. 2, 2018 (JP) .............................. JP2018-145679

(51) Int. Cl.
*B23Q 3/08* (2006.01)
*B23Q 3/06* (2006.01)

(52) U.S. Cl.
CPC ............. *B23Q 3/082* (2013.01); *B23Q 3/062* (2013.01); *B23Q 2703/04* (2013.01)

(58) Field of Classification Search
CPC .. B30B 1/16; B30B 1/20; B30B 1/326; B30B 1/32; B30B 1/323; B30B 1/18; B30B 1/181; B30B 1/183; B30B 1/185; B30B 1/186; B30B 1/188; B25B 5/064; B25B 5/122; B25B 5/065; B25B 5/06; B25B 5/061; B25B 5/04; B25B 5/14; B25B 5/18; B23Q 2703/00; B23Q 2703/02; B23Q 2703/04; B23Q 3/08; B23Q 3/082; B23Q 3/062
See application file for complete search history.

(56) References Cited

U.S. PATENT DOCUMENTS 6,644,637 B1 * 11/2003 Shen ....................... B25B 5/061
269/152

FOREIGN PATENT DOCUMENTS

| JP | 56-163854 A | 12/1981 |
| JP | 60-138647 U | 9/1985 |
| JP | 02-028000 Y2 | 7/1990 |
| JP | 6-74242 U | 10/1994 |
| JP | 2013-094950 A | 5/2013 |

OTHER PUBLICATIONS

Office Action dated Nov. 9, 2020 in Japanese Application No. 2018-145679.

* cited by examiner

*Primary Examiner* — Tyrone V Hall, Jr.
(74) *Attorney, Agent, or Firm* — Sughrue Mion, PLLC

(57) ABSTRACT

An object of the present invention is to provide a clamping device in which replacement work is easy and hydraulic hoses do not need to be laid between a body of the clamping device body and a pressurization device. The present invention is a clamping device in which a pressurization device (4) is configured from a plunger cylinder unit (5) that accommodates a pressure medium (M) provided in a body part (1), a plunger unit (6) that moves through the interior of the plunger cylinder unit (5) and pressurizes the pressure medium (M), and a manual operation part (7) for operating the movement of the plunger unit (6). A clamp part (3) is detachably and replaceably provided to the body part (1).

5 Claims, 5 Drawing Sheets

CLAMPING DEVICE

TECHNICAL FIELD

The present invention relates to a clamping device.

BACKGROUND ART

Clamping devices have been used in the prior art when a mold is to be secured. As shown in, e.g., Patent Citations 1 and 2, such clamping devices are generally provided with a body attached to the base of a press device, a cylinder device provided on the body and actuated by the supplying of a pressure medium, and a lever-form clamp part swingably provided to the body and pushed and actuated by the cylinder device, the cylinder device being actuated by the pressure medium supplied by a pressurization device to push the clamp part, whereby the clamp part is actuated to press and secure the mold.

PRIOR ART DOCUMENTS

Patent Documents

[Patent Document 1] JP U H02-28000
[Patent Document 2] JP A 2013-94950

DISCLOSURE OF THE INVENTION

Problem the Invention is to Solve

However, the prior-art clamping devices described above have a configuration in which the pressurization device for supplying the pressure medium to the cylinder device for actuating the clamp part is installed in a separate location set apart from the body and is connected via hydraulic hoses. Consequently, several hydraulic hoses are led around the periphery of the press device, and a worker is liable suffer injury by tripping on the hydraulic hoses, or the hydraulic hoses could get damaged and the clamp could disengage during operation.

Additionally, the thickness of the mold attached to the press device varies, and therefore various types of clamping devices suitable for each mold must be provided and the clamping device replaced on each occasion to match the thickness of the mold. Costs are incurred, and since, as described above, the prior-art clamping device is connected with hydraulic hoses, the hydraulic hoses must be painstakingly detached and attached when the clamping device is replaced, and the replacement work is labor-intensive. Furthermore, any failure to connect the hydraulic hoses properly due to work error, etc., may result in malfunctioning in which the clamp detaches during operation.

An object of the present invention is to overcome the above-described problems of prior-art clamping devices, and provide an innovative clamping device in which costs can be reduced, hydraulic hoses do not need to be laid between the clamping device body and pressurization device, and clamp replacement can be made less labor-intensive.

Means for Solving the Problem

The main points of the present invention will be described with reference to the attached drawings.

The present invention relates to a clamping device comprising a body part 1 attached to a base 20 to which a securing member 30 is secured, a push-operation part 2 that is provided to the body part 1 and that is actuated by supplying of a pressure medium M, and a clamp part 3 that is swingably provided to the body part 1 and pushed and actuated by the push-operation part 2, the actuating of the push-operation part 2 by the pressure medium M supplied by a pressurization device 4 pushing the clamp part 3, whereby the clamp part 3 is actuated, the securing member 30, which is positioned on the base 20, is pressed, and the securing member 30 is secured to the base 20, wherein the clamping device is characterized in that the pressurization device 4 is provided with a plunger cylinder unit for accommodating the pressure medium M, which is provided within the body part, a plunger unit 6 that moves through the interior of the plunger cylinder 5 to pressurize the pressure medium M, and a manual operation part 7 for operating the movement of the plunger unit 6; the plunger unit 6 is moved by operation of the manual operation part 7 and the pressure medium M in the plunger cylinder unit 5 is pressurized and supplied via pumping to the push-operation part 2; and the clamp part 3 is detachably and replaceably provided to the body part 1.

Another aspect of the present invention relates to the clamping device according to the first aspect, characterized in that the clamp part 3 is swingably provided to the body part 1 by a shaft member 8 insertably/detachably provided to the body part 1; and the clamp part 3 can be removed from the body part 1 for replacement by removing the shaft member 8.

Another aspect of the present invention relates to the clamping device according to the first aspect, characterized in that the manual operation part 7 is provided with an externally threaded screw part 7A and an internally threaded screw part 7B; and the plunger unit 6 is actuated by an operation for threading the externally threaded screw part 7A into the internally threaded screw part 7B.

Another aspect of the present invention relates to the clamping device according to the second aspect, characterized in that the manual operation part 7 is provided with an externally threaded screw part 7A and an internally threaded screw part 7B; and the plunger unit 6 is actuated by an operation for threading the externally threaded screw part 7A into the internally threaded screw part 7B.

Another aspect of the present invention relates to the clamping device according to any of the first through fourth aspects, characterized in that the clamp part 3 is provided with an operational-use through-hole 9 into which a manual operation tool T for manually operating the manual operation part 7 can be inserted; the manual operation tool T is positioned in the manual operation part 7 via the operational-use through-hole 9; and the manual operation part 7 is manually operated.

Effect of the Invention

Due to being configured in the manner described above, the present invention is an innovative clamping device in which costs can be reduced, hydraulic hoses do not need to be laid between the clamping device body and pressurization device, and clamp replacement can be performed in a less labor-intensive manner.

BEST MODE FOR CARRYING OUT THE INVENTION

Figure 1:
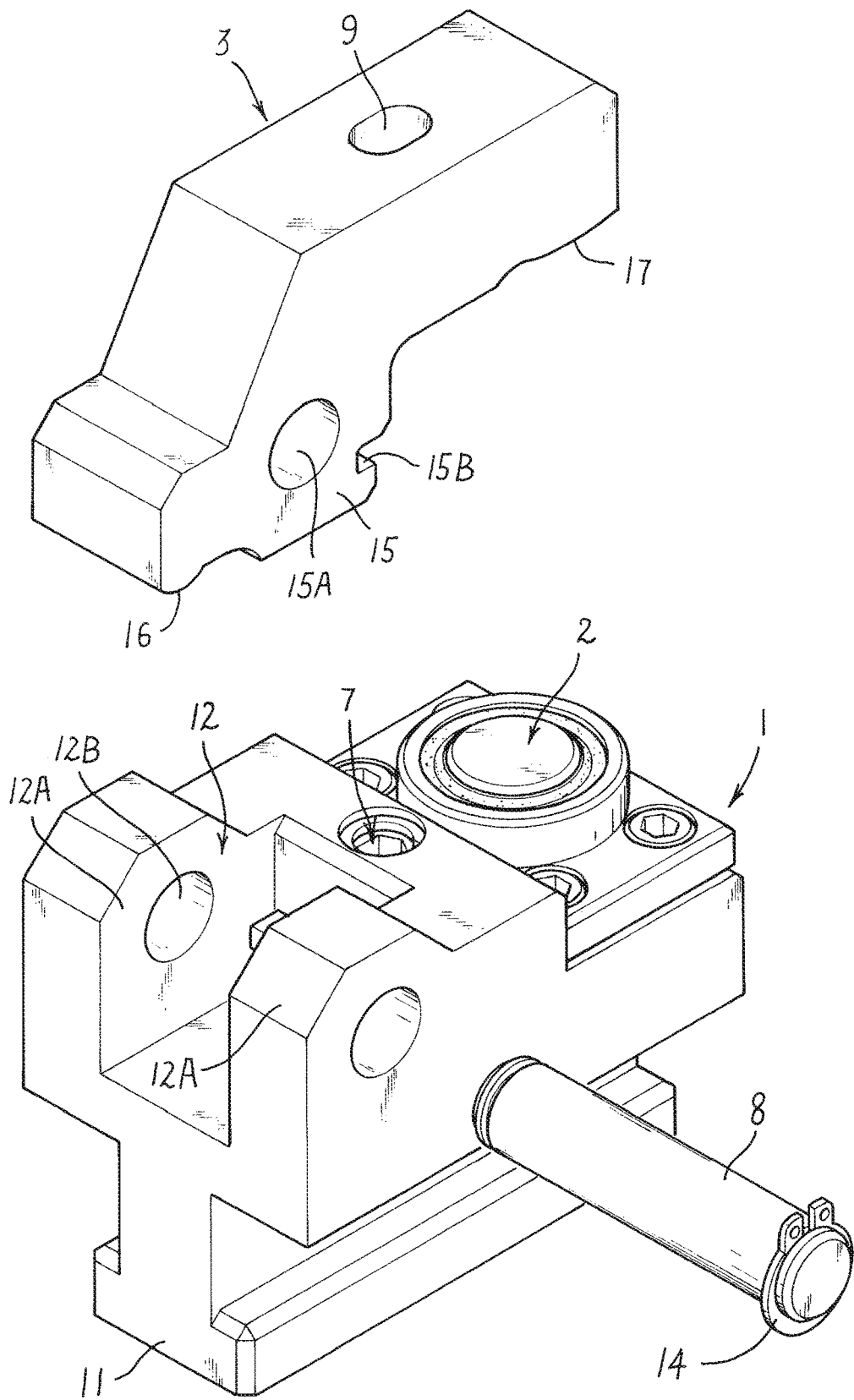
FIG. 1 is an exploded perspective showing the present example.

Preferred embodiments of the present invention are briefly described below with reference to the drawings while indicating the effects of the present invention.

When a manual operation part 7 of a pressurization device 4 provided in a body part 1 is operated and a plunger unit 6 of the pressurization device 4 provided in the body part 1 is moved in a pushing direction, the plunger unit 6 presses a pressure medium M in a plunger cylinder unit 5, and the pressure medium M is supplied via pumping to a push-operation part 2 by pressure imparted by the plunger unit 6 through a flow path 10 formed in the body part 1.

The push-operation part 2 is actuated by the pressure medium M supplied via pumping from the pressurization device 4 and pushes one side of the clamp part 3 upward, whereby the other side of the clamp part 3 moves downward and presses the securing member 30 positioned on the base 20, and the securing member 30 is secured to the base 20 by the clamp part 3 being pressed and locked to the securing member 30.

In other words, in the present invention, as described above, the pressurization device 4 for actuating the clamp part 3 is provided in and integrated with the body part 1, resulting in a configuration that requires no hydraulic hoses that are provided to prior-art clamping devices in which the pressurization device is provided as a separate unit from the body part of the clamping device. For example, when the present invention is used in a clamping device for securing a mold of a press device, hydraulic hoses are not laid around the periphery of the press device, thus obviating any concerns that a worker will suffer injury by tripping over the hydraulic hoses, or cause damage to the hydraulic hoses and disengage the clamp during operation. Furthermore, when the clamping device is to be replaced, no work is needed to attach/detach the hydraulic hoses; therefore, the replacement operation is facilitated, and the possibility of any trouble due to a mistake in connecting the hydraulic hoses is eliminated.

Additionally, the present invention has a configuration in which the clamp part 3 is detachably and replaceably provided to the body part 1. Therefore, when the clamping device is to be replaced to match the thickness of the mold, it is only necessary to remove the clamp part 3 from the body part 1 and replace with a clamp part 3 suitable for the thickness of the mold. The body part 1 does not need to be painstakingly removed, replacement work is facilitated to an even further degree, and there is no need to provide several body parts 1. Merely providing the clamp part 3 makes it possible to respond to a different configuration, and therefore costs can also be reduced.

Thus, the present invention is an innovative clamping device in which costs can be reduced, hydraulic hoses do not need to be laid between the clamping device body 1 and pressurization device 4, and clamp replacement can be performed in a less labor-intensive manner.

Example

A specific example of the present invention is described below with reference to the drawings.

The present example is a case in which the clamping device of the present invention is configured as a clamping device for a press device that secures a mold of a press device. Specifically, the present example comprises a body part 1 attached to a base 20 to which a mold 30 serving as a securing member 30 is secured, and a clamp part 3 provided to the body part 1. A push-operation part 2 provided to the body part 1 is actuated by a pressure medium M supplied by a pressurization device 4 and pushes the clamp part 3, whereby the clamp part 3 is actuated, the mold 30 set on the base 20 of the press device is pressed, and the mold 30 is secured to the base 20.

The constituent parts according to the present example are described in detail below.

Figure 2:
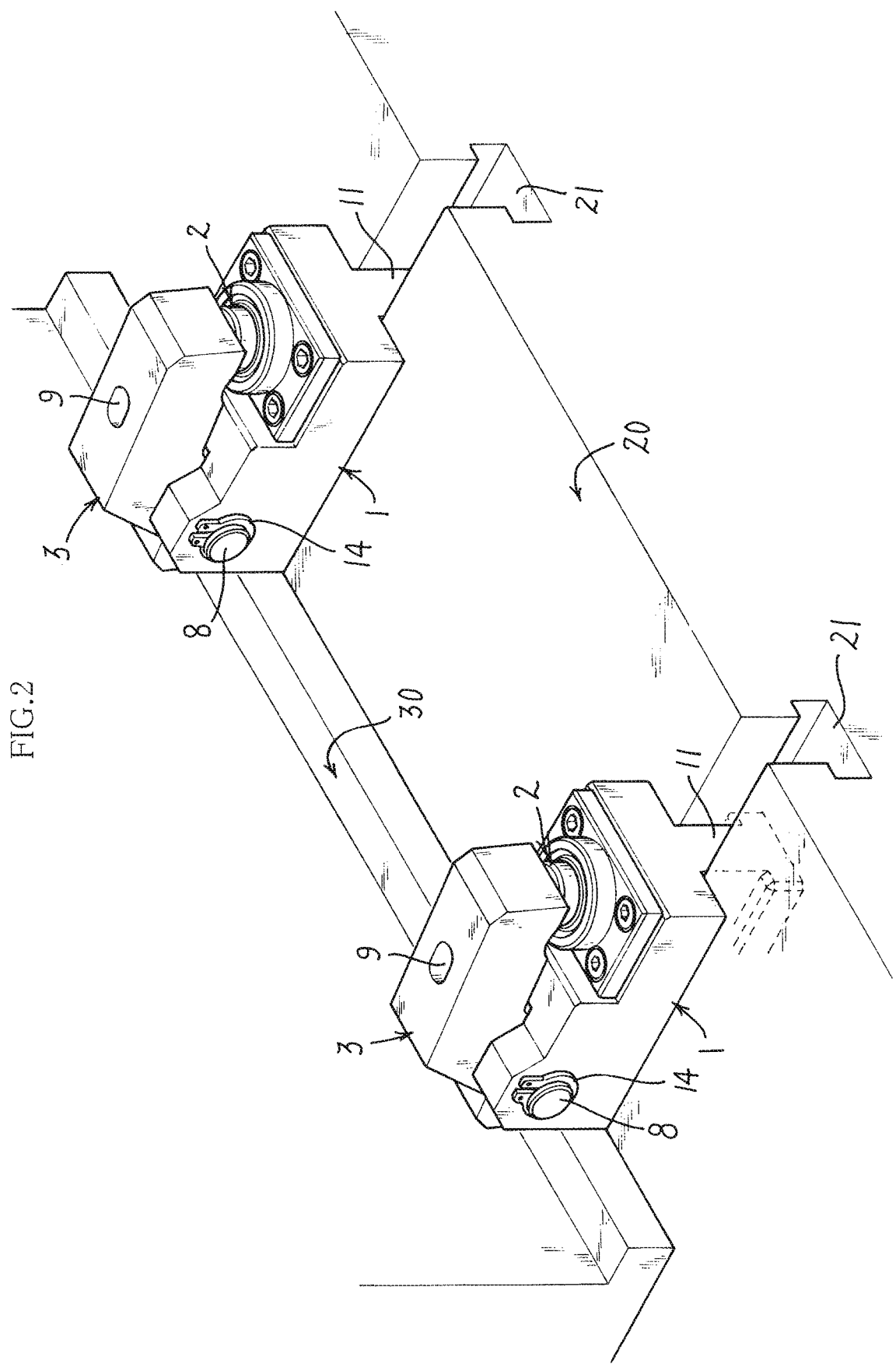
FIG. 2 is a schematic perspective view showing the present example in use.

The body part 1 of the present example has, on the lower side thereof, a base-mounting engagement part 11 for mounting the body part 1 to the base 20, and a clamp installation part 12 provided thereabove on which the clamp part 3 is provided, as shown in FIGS. 1 and 2. Further provided within the body part 1 are: the push-operation part 2 for pushing the clamp part 3 provided to the clamp installation part 12, the pressurization device 4 for actuating the push-operation part 2, and a clamp-returning mechanism 13 for returning the clamp part 3 from a clamped state to an unclamped state when the pushing action of the push-operation part 2 against the clamp part 3 has been discontinued.

Specifically, the base-mounting engagement part 11 is formed in a T shape extending in the longitudinal direction, and slidably engages, in a detachable manner, in a T groove part 21 formed in the base 20.

The clamp installation part 12 comprises a pair of shaft support parts 12A having shaft through-holes 12B and disposed facing each other, and a shaft member 8 inserted into the shaft through-holes 12B and bridging the shaft support parts 12A, the clamp part 3 being swingably provided to the shaft member 8 bridging the shaft support parts 12A.

The shaft member 8 of the present example is insertably provided in a retained state through the shaft support parts 12A by a retaining member 14 detachably provided to the shaft member 8, and is insertably/detachably provided to the shaft support parts 12A by attachment/detachment of the retaining member 14.

The push-operation part 2 comprises a cylinder part 2A and a piston part 2B provided so as to be capable of reciprocating movement inside the cylinder part 2A, the piston part 2B being pressed by the pressure medium M supplied inside the cylinder part 2A and moving upward in a protruding fashion by the pressing action, pushing the clamp part 3.

The pressurization device 4 comprises a plunger cylinder unit 5 that accommodates the pressure medium M disposed in the body part 1, a plunger unit 6 that moves through the interior of the plunger cylinder unit 5 and pressurizes the pressure medium M in the plunger cylinder unit 5, and a manual operation part 7 for operating the movement of the plunger unit 6. The plunger unit 6 moves by operation of the manual operation part 7, the pressure medium M in the plunger cylinder unit 5 is pressurized, and the pressure medium M is supplied by pumping to the push-operation part 2.

Specifically, the plunger cylinder unit 5 is formed in a cylindrical shape, and is provided upright (formed extending in the vertical direction) inside the body part 1; i.e., inside the base-mounting engagement part 11 provided to the lower side of the body part 1. The flow path 10 that passes to the cylinder part 2A of the push-operation part 2 is formed in continuation from the opening part on the lower side.

The plunger unit 6 is provided so as to be capable of moving in the vertical direction (performing reciprocating movement) inside the plunger cylinder unit 5, and presses the pressure medium M in the plunger cylinder unit 5 by moving downward.

The manual operation part 7 comprises an externally threaded screw part 7A that is helically formed in the vertical direction of the body part 1, and an internally threaded screw part 7B for threadably engaging the externally threaded screw part 7A. The externally threaded screw part 7A is provided in continuation with the upper side of the plunger cylinder unit 5, and the internally threaded screw part 7B is provided to the base end part (upper end part) of the plunger unit 6.

In other words, the pressurization device 4 of the present example is configured so that the internally threaded screw part 7B of the manual operation part 7 is threadably inserted using a screwdriver, wrench, or other manual operation tool T, whereby the internally threaded screw part 7B moves downward, the plunger unit 6 also moves downward in accompaniment with the downward movement of the internally threaded screw part 7B and presses the pressure medium M in the plunger cylinder unit 5, and the pressed pressure medium M is supplied via pumping inside the push-operation part 2 (cylinder part 2A) via the flow path 10.

The clamp return operation mechanism 13 comprises a clamp engagement part 13A for engaging the clamp part 3, and an urging member 13B (a coil spring 13B is used in the present example) for urging the clamp engagement part 13A in the return position direction. Pushed by the push-operation part 2, the clamp part 3 is clamped, whereby the clamp engagement part 13A moves (upward in the present example), the coil spring 13B extends or contracts (contracts in the present example) to a accumulated-pressure state in accompaniment with the movement of the clamp engagement part 13A, and when the pushing action of the push-operation part 2 against the clamp part 3 is discontinued, the accumulated-pressure state of the coil spring 13B is released, the clamp engagement part 13A moves in returning fashion (downward) by the contraction or extension (extension in the present example) of the coil spring 13B, the clamp engagement part 13A moves and returns, whereby the clamp part 3 with which the clamp engagement part 13A engages is caused to return from the clamped state to the unclamped state.

Although not shown, a pressure medium filling part for filling the pressure medium M into the plunger cylinder unit 5 of the pressurization device 4, the flow path 10, and the cylinder part 2A of the push-operation part 2 is provided to the body part 1. In the present example, the pressure medium filling part is provided in continuation to the flow path 10, and the pressure medium M can be filled into each part by way of the flow path 10.

A pressing and locking part 16 for pressing the mold 30 during clamping is provided to the distal end side of the clamp part 3, a to-be-pushed part 17 pushed by the push-operation part 2 is provided to the base end side of the clamp part 3, and a main-unit engaging part 15 pivotably provided (shaft-mounted) to the clamp installation part 12 of the body part 1 is provided therebetween.

Specifically, the main-unit locking part 15, when provided in an engaged manner to the clamp installation part 12, is provided with: a shaft insertion through-hole 15A which is in a communicative state with the shaft through-holes 12B provided to the shaft support parts 12A of the clamp installation part 12 and through which the shaft member 8 is inserted; and a passive-engagement part 15B with which the clamp engagement part 13A of the clamp return operation mechanism 13 engages. The clamp part of the present example is configured such that the shaft member 8 bridging the shaft support parts 12A of the clamp installation part 12 is removably inserted in the shaft insertion through-hole 15A provided to the main-unit locking part 15 and is thereby detachably provided to the body part 1.

As shown in the drawings, the clamp part 3 of the present example is provided with an operational-use through-hole 9 that passes through in the vertical direction in a location directly above the manual operation part 7 of the pressurization device 4 in a state provided to the body part 1. The operational-use through-hole 9 is formed in a shape that allows insertion of the manually operation tool T used when the manual operation part 7 of the pressurization device 4 is manually operated.

Figure 3:
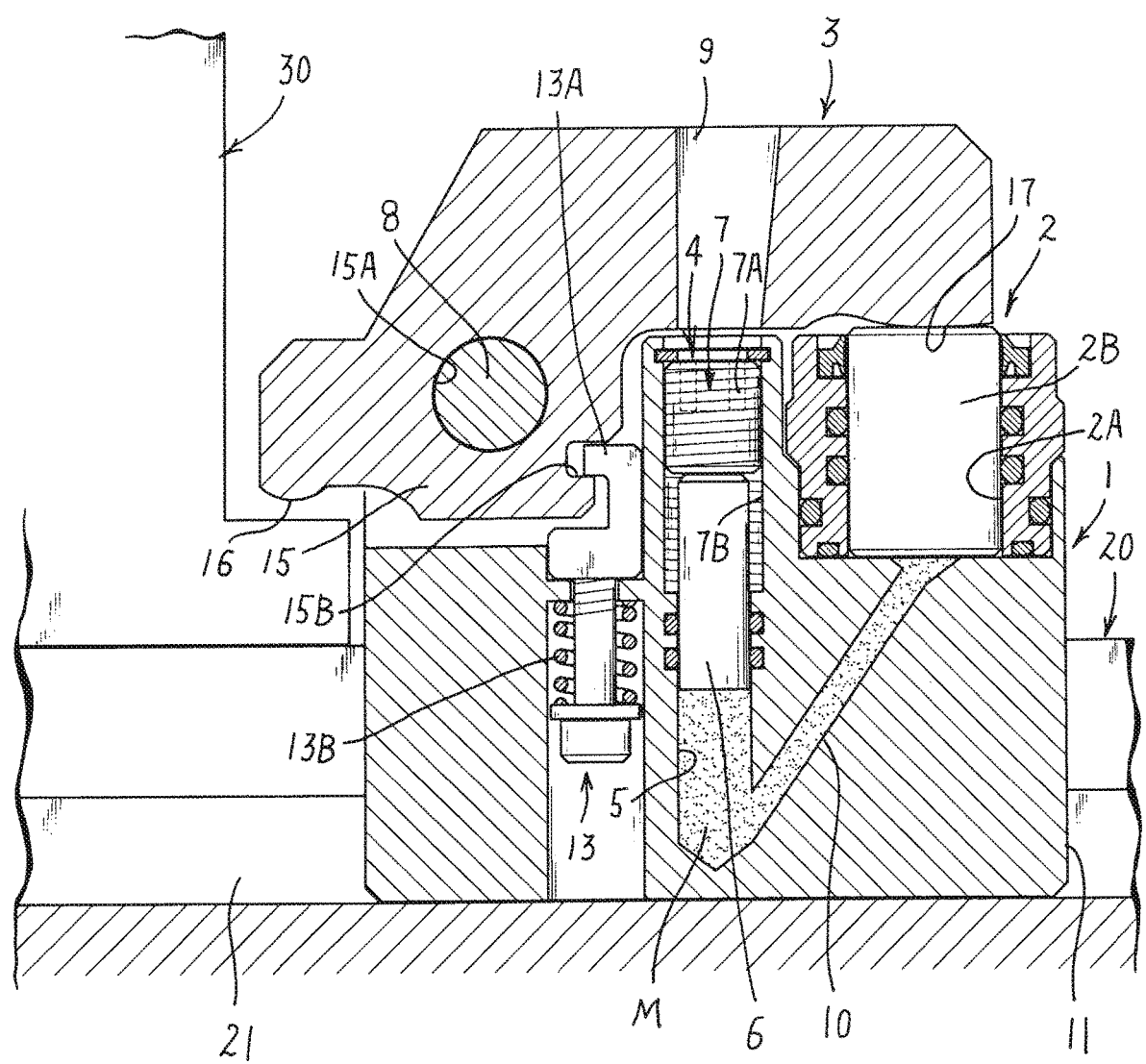
FIG. 3 is schematic cross-sectional view showing the present example in an unclamped state.
Figure 4:
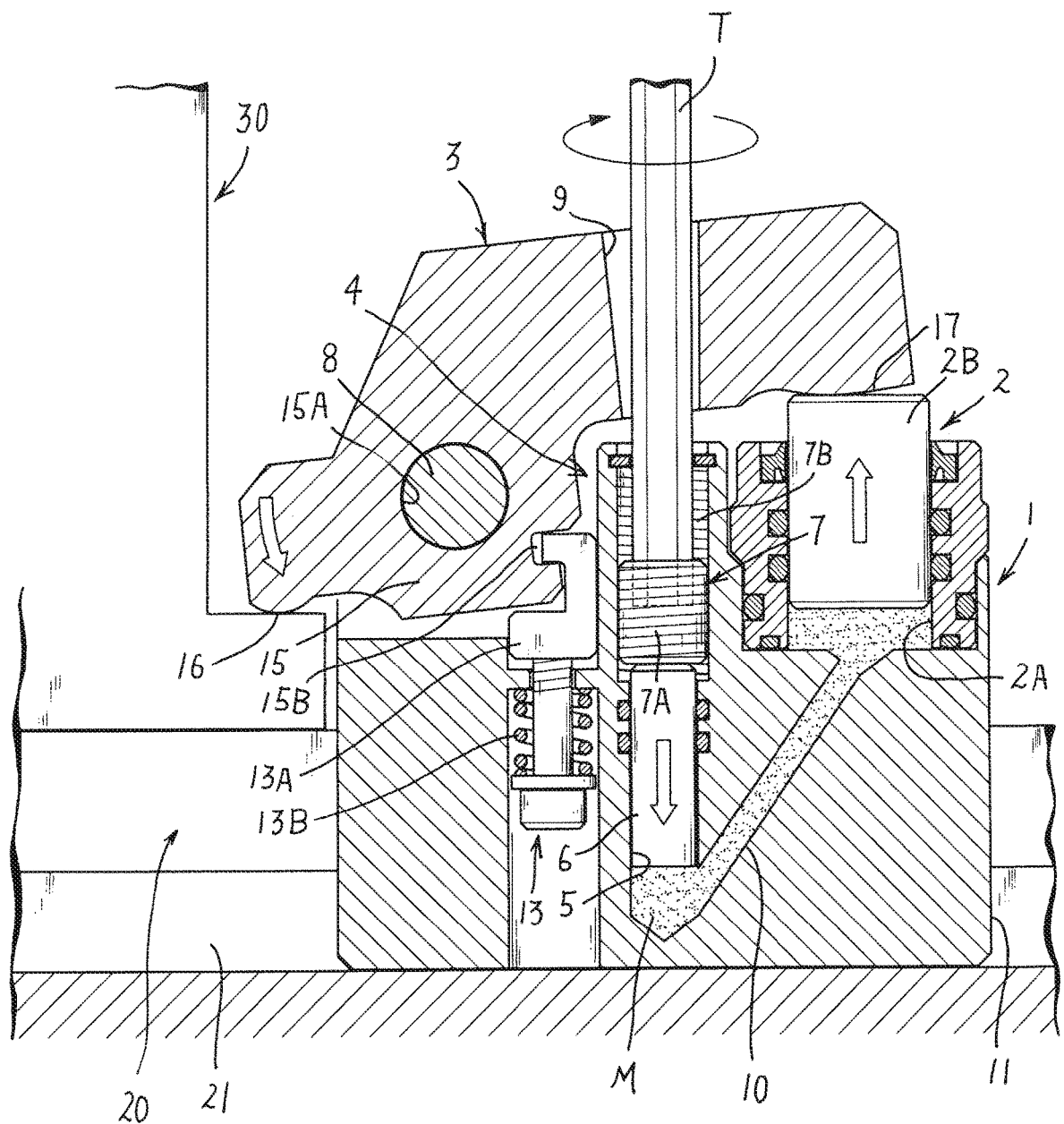
FIG. 4 is a schematic cross-sectional view showing the present example in a clamped state.

More specifically, the operational-use through-hole 9 is formed in a tapered shape, and when the clamp part 3 is in an unclamped state (horizontal state), the internal peripheral surface of the distal end side of the operational-use through-hole 9 is in a vertical state, as shown in FIG. 3. Setting the manual operation tool T along the internal peripheral surface of the distal end side in the vertical state allows the manual operation tool T to be smoothly positioned in the internally threaded screw part 7B of the manual operation part 7, and when the clamp part 3 is in a clamped state (front down state), the internal peripheral surface of the base end side of the operational-use through-hole 9 is in a vertical state, as shown in FIG. 4. Setting the manual operation tool T along the internal peripheral surface of the base end side in the vertical state allows the manual operation tool T to be smoothly positioned in the internally threaded screw part 7B of the manual operation part 7.

In the present example configured as described above, the pressurization device 4 is provided inside, and is integrated with, the body part 1, which has been provided separately from the clamping device in the prior art, as described above. Furthermore, the pressurization device 4 and the push-operation part 2 intercommunicate by way of the flow path 10 formed in the body part 1; therefore, hydraulic hoses via which the pressurization device 4 and the push-operation part 2 communicate are not required. Therefore, hydraulic hoses are not laid about the periphery of the press device, and consequently, there is no concern that a worker will suffer injury by tripping on the hydraulic hoses, or that the hydraulic hoses will be damaged and the clamp will disengage during operation. Furthermore, when the clamping device is to be replaced, work for detaching and attaching hydraulic hoses is not performed; therefore, replacement work is facilitated, and any possible issues due to faulty connection of the hydraulic hoses are obviated.

When a lever-type clamping device has been used in the prior art, most pressurization devices for actuating the clamp part are driven by mechanical operation using a pump or the like; however, in the present example, the manual operation unit 7 configured from the internally threaded screw part 7B and the male screw 7A is provided, and is driven by manual operation; i.e., human operation. This enables manufacturing at low cost.

Figure 5:
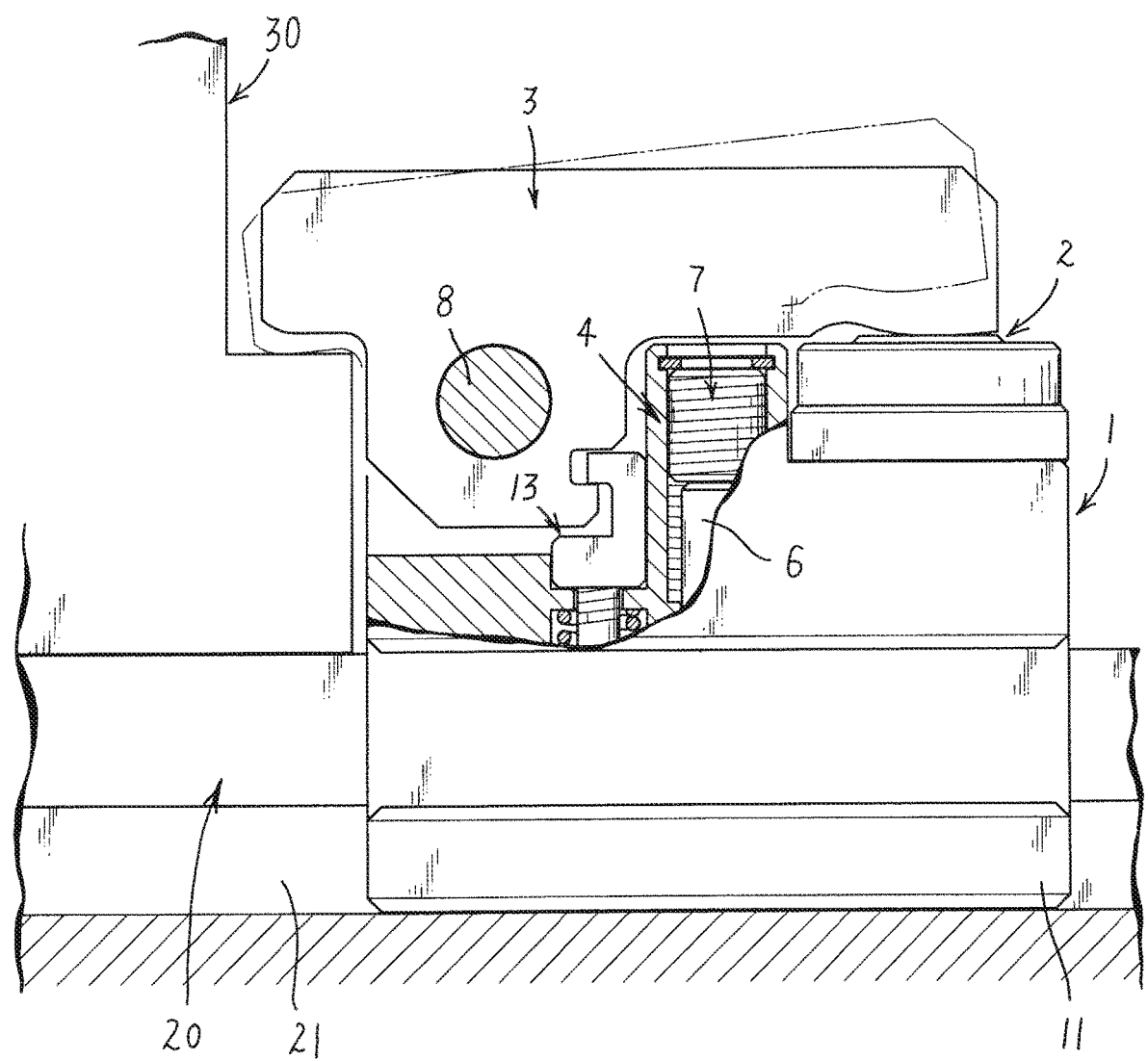
FIG. 5 is a schematic view showing the present example in a state in which the clamp part has been replaced.

Furthermore, in the present example, the clamp part 3 is configured to be detachable and replaceable; therefore, when the clamping device is to be replaced to match the thickness of the mold 30, the clamp part 3 is removed from the body part 1, and, as shown in FIG. 5, all that is required is to attach the clamp part 3 suitable for the thickness of the mold 30.

Since the body part 1 does not have to be painstakingly removed, replacement work is facilitated to a much greater extent. Also, there is no need to provide several body parts 1; merely providing the clamp part 3 makes it possible to handle a different configuration, which also allows costs to be reduced.

Thus, the present example is an extremely practical, innovative clamping device that does not exist in the prior art, allowing costs to be reduced, the laying of hydraulic hoses between the body part 1 and the pressurization device 4 of the clamping device to be obviated, and clamp replacement to be performed in a less labor-intensive manner.

The present invention is not limited to the present example; specific configurations for a variety of structural requirements can be designed, as appropriate.

The invention claimed is:

1. A clamping device comprising a body part attached to a base to which a securing member is secured, a push-operation part that is provided to the body part and that is actuated by a pressure medium supplied by a pressurization device, and a clamp part that is swingably provided in the vertical direction to the body part and pushed and actuated by the push-operation part and securing the securing member attached to the base and detachably and replaceably provided to the body part, the clamping device is characterized in that the pressurization device is provided with a plunger cylinder unit for accommodating the pressure medium, which is provided within the body part, a plunger unit that moves through the interior of the plunger cylinder to pressurize the pressure medium, and a manual operation part for operating the movement of the plunger unit; the plunger unit is moved by operation of the manual operation part and the pressure medium in the plunger cylinder unit is pressurized and supplied via pumping to the push-operation part; and the push-operation part moves upward in a protruding fashion by being pressed by the pressure medium pumped by the pressurization device and pushing up the base end side of the clamp part from below, and the clamp part swings by upward movement in a protruding fashion, and tip side of the locking part moves downward and presses the securing member.

2. The clamping device according to claim 1, characterized in that the clamp part is swingably provided to the body part by a shaft member insertably/detachably provided to the body part, and the clamp part can be removed from the body part for replacement by removing the shaft member.

3. The clamping device according to claim 2, characterized in that the manual operation part is provided with an externally threaded screw part and an internally threaded screw part; and the plunger unit is actuated by an operation for threading the externally threaded screw part into the internally threaded screw part.

4. The clamping device according to claim 1, characterized in that the manual operation part is provided with an externally threaded screw part and an internally threaded screw part; and the plunger unit is actuated by an operation for threading the externally threaded screw part into the internally threaded screw part.

5. The clamping device according to claim 1, characterized in that the clamp part is provided with an operational-use through-hole into which a manual operation tool for manually operating the manual operation part can be inserted; the manual operation tool is positioned in the manual operation part via the operational-use through-hole; and the manual operation part is manually operated.

* * * * *